United States Patent
Zhao et al.

(10) Patent No.: US 12,541,000 B2
(45) Date of Patent: Feb. 3, 2026

(54) METHOD AND APPARATUS FOR POSITIONING

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/291,067

(22) Filed: Aug. 5, 2025

(65) Prior Publication Data
US 2025/0355073 A1 Nov. 20, 2025

Related U.S. Application Data

(63) Continuation of application No. PCT/CN2023/096575, filed on May 26, 2023.

(30) Foreign Application Priority Data
Oct. 25, 2022 (CN) .......................... 202211310720.9

(51) Int. Cl.
G01S 5/02 (2010.01)
G01S 5/14 (2006.01)

(52) U.S. Cl.
CPC ................ G01S 5/021 (2013.01); G01S 5/14 (2013.01)

(58) Field of Classification Search
CPC .................................. G01S 5/021; G01S 5/14
See application file for complete search history.

(56) References Cited

U.S. PATENT DOCUMENTS

| | | | | |
|---|---|---|---|---|
| 6,990,428 B1* | 1/2006 | Kaiser | ....................... | G01S 5/14 709/224 |
| 2005/0285793 A1* | 12/2005 | Sugar | ....................... | G01S 5/14 342/465 |
| 2023/0105698 A1* | 4/2023 | Lowe | ....................... | G01S 5/14 342/451 |

FOREIGN PATENT DOCUMENTS

| | | | | |
|---|---|---|---|---|
| CN | 109782227 A | * | 5/2019 | |
| CN | 111225439 A | * | 6/2020 | .............. G01S 11/06 |

(Continued)

OTHER PUBLICATIONS

S.J. Ambroziak et al., Path Loss Modelling for Location Service Applications, 2013 7th European Conference on Antennas and Propagation (EuCAP), IEEE, p. 991-994 (Year: 2013).*

(Continued)

*Primary Examiner* — Robert W Hodge
*Assistant Examiner* — Fred H Mull
(74) *Attorney, Agent, or Firm* — Fish & Richardson P.C.

(57) ABSTRACT

The present disclosure provides a method and apparatus for positioning. One example method includes: determining, by a positioning device, first distances between a terminal device and a plurality of base stations respectively according to path losses of the plurality of base stations and a distance fitting formula; determining, by the positioning device, position information of the terminal device based on the first distances between the terminal device and the plurality of base stations; determining, by the positioning device, a position error of the terminal device based on the position information of the terminal device, position information of the plurality of base stations, and the first distances; and determining, by the positioning device, whether to adjust parameters in the distance fitting formula based on the position error.

20 Claims, 7 Drawing Sheets

(56) References Cited

FOREIGN PATENT DOCUMENTS

| CN | 114169423 A | * | 3/2022 | ............. G06F 18/25 |
| CN | 115942454 A | | 4/2023 | |

OTHER PUBLICATIONS

3GPP TR38.901 "3rd Generation Partnership Project; Technical Specification Group Radip Access Network; Study on channel model for frequencies from 0.5 to 100 GHz (Release 17)," Mar. 2022, 9 pages.
International Search Report in International Appln. No. PCT/CN2023/096575, dated Jul. 29, 2023, 5 pages (with English translation).
Office Action in Chinese Appln. No. 202211310720.9, dated Jun. 18, 2025, 12 pages (with English translation).

* cited by examiner

METHOD AND APPARATUS FOR POSITIONING

CROSS-REFERENCE TO RELATED APPLICATIONS

This application is a continuation of International Application No. PCT/CN2023/096575, filed on May 26, 2023, which claims priority to Chinese Patent Application No. 202211310720.9, filed on Oct. 25, 2022. The disclosures of the aforementioned applications are hereby incorporated by reference in their entireties.

TECHNICAL FIELD

The present disclosure relates to the field of communication technology, and more specifically to a method and apparatus for positioning.

BACKGROUND

Currently, a method for positioning based on a path loss is provided. A positioning device determines a distance between a terminal device and a base station based on the path loss of the base station and a distance fitting formula. Furthermore, the positioning device performs position solution based on the distance between the terminal device and the base station to obtain the position information of the terminal device. However, the above method for positioning has the issue of an inappropriate distance fitting formula, and if the distance fitting formula is inappropriate, positioning accuracy of the terminal device will be affected.

SUMMARY

Embodiments of the present disclosure aim to provide a method and apparatus for positioning, which is conducive to improving the positioning accuracy.

According to a first aspect, a method for positioning is provided, including: determining, by a positioning device, first distances between a terminal device and a plurality of base stations respectively according to path losses of the plurality of base stations and a distance fitting formula; determining, by the positioning device, position information of the terminal device based on the first distances between the terminal device and the plurality of base stations; determining, by the positioning device, second distances between the terminal device and the plurality of base stations respectively according to the position information of the terminal device and position information of the plurality of base stations; determining, by the positioning device, a position error of the terminal device based on the first distances and the second distances; and determining, by the positioning device, whether to adjust parameters in the distance fitting formula based on the position error.

According to a second aspect, a positioning device is provided, including: a determining unit, configured to determine first distances between a terminal device and a plurality of base stations respectively according to path losses of the plurality of base stations and a distance fitting formula; where the determining unit is further configured to determine position information of the terminal device based on the first distances between the terminal device and the plurality of base stations; the determining unit is further configured to determine a position error of the terminal device based on the position information of the terminal device, position information of the plurality of base stations, and the first distances; and the determining unit is further configured to determine whether to adjust parameters in the distance fitting formula based on the position error.

According to a third aspect, a positioning device is provided, including a processor and a memory, where the memory is configured to store one or more computer programs, and the processor is configured to invoke the computer programs in the memory to cause a positioning device to perform some or all of the operations in the method according to the first aspect.

According to a fourth aspect, an embodiment of the present disclosure provides a computer-readable storage medium storing a computer program, where the computer program causes a device to perform some or all of the operations in the method according to the first aspect.

According to a fifth aspect, an embodiment of the present disclosure provides a computer program product, including: a non-transitory computer-readable storage medium storing a computer program, where the computer program is executable to cause a terminal to perform some or all of the operations in the method according to the first aspect. In some implementations, the computer program product may be a software installation package.

According to a sixth aspect, an embodiment of the present disclosure provides a chip, including: a memory and a processor, where the processor invokes a computer program from the memory and run the computer program, to implement some or all of the operations described in the method according to the first aspect.

In the embodiments of the present disclosure, the position information of the terminal device is combined with the distance fitting formula to determine the accuracy of the position information of the terminal device, and then whether the distance fitting formula is appropriate is determined based on the accuracy of the position information, that is, whether to adjust the distance fitting formula is determined based on the accuracy of the position information. By determining whether the distance fitting formula is appropriate, it is conducive to improving the positioning accuracy of the terminal device.

DETAILED DESCRIPTION OF THE EMBODIMENTS

The technical solutions in the embodiments of the present disclosure will be clearly and completely described below with reference to the accompanying drawings in the embodiments of the present disclosure. Apparently, the described embodiments are only a part of but not all of the embodiments of the present disclosure.

Figure 1:
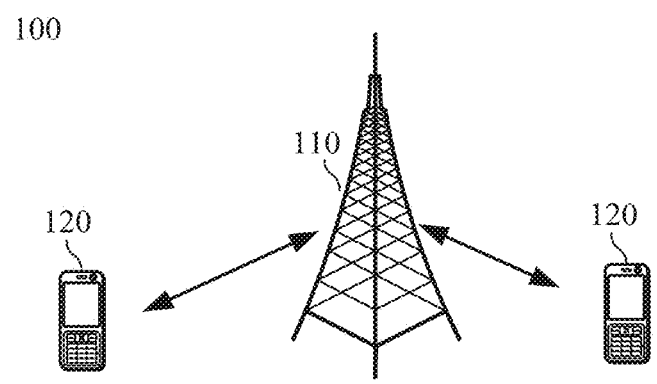
FIG. 1 shows a wireless communication system applied in an embodiment of the present disclosure.

FIG. 1 is a wireless communication system 100 applied in embodiments of the present disclosure. The wireless communication system 100 includes a network device 110 and a terminal device 120, and the network device 110 may be a device that communicates with the terminal device 120. The network device 110 provides communication coverage for a particular geographic region and communicates with the terminal device 120 located within the coverage region.

FIG. 1 exemplarily shows a network device and two terminals. Optionally, the wireless communication system 100 may include a plurality of network devices, and a coverage area of each network device may include other numbers of terminals, which is not limited in the embodiments of the present disclosure.

Optionally, the wireless communication system 100 may further include another network entity such as a network controller, a mobility management entity, etc., which is not limited in the embodiments of the present disclosure.

It should be understood that the technical solutions in the embodiments of the present disclosure may be applied to various communication systems, for example, a $5^{th}$ generation (5G) or new radio (NR) system, a long term evolution (LTE) system, an LTE frequency division duplex (FDD) system, an LTE time division duplex (TDD) system, and the like. The technical solutions provided in the present disclosure may further be applied to a future communication system such as a sixth-generation mobile communication system, a satellite communication system, or the like.

The terminal device in the embodiments of the present disclosure may also be referred to as user equipment (UE), an access terminal, a subscriber unit, a subscriber station, a mobile station (MS), a mobile terminal (MT), a remote station, a remote terminal, a mobile device, a user terminal, a terminal, a wireless communication device, a user agent, or a user equipment. The terminal device in the embodiments of the present disclosure may be a device that provides voice and/or data connectivity to a user, and may be used to connect a person, an object, and a machine, for example, a handheld device or a vehicle-mounted device having a wireless connection function. The terminal device in the embodiments of the present disclosure may be a mobile phone, a pad, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in smart home, etc. Optionally, the UE may serve as a base station.

It should be further understood that, in the embodiments of the present disclosure, the terminal device may include but is not limited to a terminal device applied to the Internet of Things, for example, may be a terminal device (may be referred to as an "NB-IoT terminal") accessing NB-IoT, e.g., an intelligent meter reading device, a logistics tracking device, an environment monitoring device, etc.

The network device in the embodiments of the present disclosure may be a device configured to communicate with the terminal device, and the network device may also be referred to as an access network device or a radio access network device, e.g., the network device may be a base station. The network device in the embodiments of the present disclosure may refer to a radio access network (RAN) node (or device) that accesses the terminal device to a wireless network. The base station may broadly cover various names in the following or be replaced with the following names. For example, a node B (NodeB), an evolved NodeB (eNB), a next generation NodeB (gNB), a relay station, an access point, a transmitting and receiving point (TRP), a transmitting point (TP), a master station (MeNB), a secondary station (SeNB), a multistandard radio (MSR) node, a femtocell, a network controller, an access node, a wireless node, an access point (AP), a transmission node, a transceiver node, a base band unit (BBU), a remote radio unit (RRU), an active antenna unit (AAU), a remote radio unit (RRH), a central unit (CU), a distributed unit (DU), a positioning node, and the like. The base station may be a macro base station, a micro base station, a relay node, a donor node or the like, or a combination thereof. The base station may also refer to a communication module, a modem, or a chip for being disposed in the foregoing device or apparatus. The base station may also be a mobile switching center and a device that plays a role of the base station in device-to-device (D2D), vehicle-to-everything (V2X), and machine-to-machine (M2M) communication, a network side device in a 6G network, and a device that plays a role of the base station in a future communication system, etc. The base station supports networks of the same or different access technologies. The specific technology adopted by the network device and a specific form of the device in the embodiments of the present disclosure are not limited in the embodiments of the present disclosure.

The base station may be fixed or mobile. For example, a helicopter or drone may be configured to serve as a mobile base station, and one or more cells move according to the position of the mobile base station. In other examples, a helicopter or drone may be configured to serve as a device in communication with another base station.

In some deployments, the network device in the embodiments of the present disclosure may refer to the CU or the DU, or the network device includes the CU and the DU. The gNB may also include the AAU.

The network device and the terminal device may be deployed on land, including indoors or outdoors, handheld or vehicle-mounted, may be deployed on a water surface, and may also be deployed on an aircraft, a balloon, and a satellite in the air. A scenario in which the network device and the terminal device are located is not limited in the embodiments of the present disclosure.

It should be understood that the communication device involved in the present disclosure may be a network device or the terminal device. For example, a first communication device is a network device, and a second communication device is a terminal device. For another example, the first communication device is a terminal device, and the second communication device is a network device. For another example, both the first communication device and the second communication device are network devices, or both are terminal devices.

It should be further understood that all or part of functions of the communication device in the present disclosure may also be implemented by a software function running on hardware, or by a virtualization function instantiated on a platform (e.g., a cloud platform). In wireless communication, spectrum shifting may be completed in a signal modulation manner. For example, a signal generated by the terminal device is a low-frequency signal, and the low-frequency signal is not suitable for transmission in a channel, and after signal modulation, the low-frequency signal may be converted into a high-frequency signal suitable for transmission in the channel.

In some application scenarios, the terminal device needs to be positioned. For example, logistics monitoring, vehicle management, public safety, weather forecast, auxiliary navigation, and the like.

A common coarse positioning manner may include cell-id based positioning, which may also be referred to as CID positioning. An implementation principle thereof may be as follows: a positioning platform transmits signaling to a core network to query an ID of a cell where the terminal device is located, and then the positioning platform may determine an approximate position of the terminal device based on data stored in a base station almanac (BSA). The positioning accuracy of this positioning manner depends on the size of the base station or the cell, generally ranging from hundreds to thousands of meters. Compared to high-accuracy positioning, the coarse positioning service has relatively low complexity.

The cell-id-based positioning technology has a problem of low positioning accuracy. To improve positioning accuracy, non-specific demand measurement quantities such as a timing advance (TA) and a signal measurement result (e.g., reference signal receiving power (RSRP)) may be utilized to assist cell-id-based positioning. Non-specific demand measurement quantities may refer to measurements performed by the terminal device to maintain connectivity or parameters notified to the terminal device by the base station. These non-specific measurement quantities may be obtained either through measurements performed by the terminal device or by measurements performed by the base station. Non-specific measurement quantities may be obtained periodically and do not rely on any specific service.

Since the terminal device may only obtain TA of a serving cell, the assistance of TA in positioning does not significantly enhance positioning accuracy. However, through signal measurements, the terminal device may obtain signal measurement results of the serving cell and neighbor cells, meaning that the terminal device may obtain signal measurement results of a plurality of cells through signal measurements. Based on this, there is an expectation to utilize signal measurement results to assist cell-id-based positioning.

Depending on the difference of input signals, positioning algorithms may be divided into two categories. One category is baseband sampling-based positioning algorithms, while the other category is long-term power averaging-based positioning algorithms.

Figure 2:
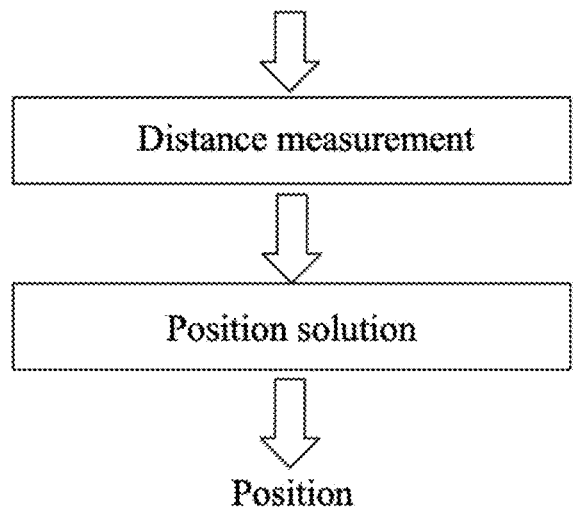
FIG. 2 is a schematic flowchart of a positioning algorithm based on baseband sampling.
Figure 3:
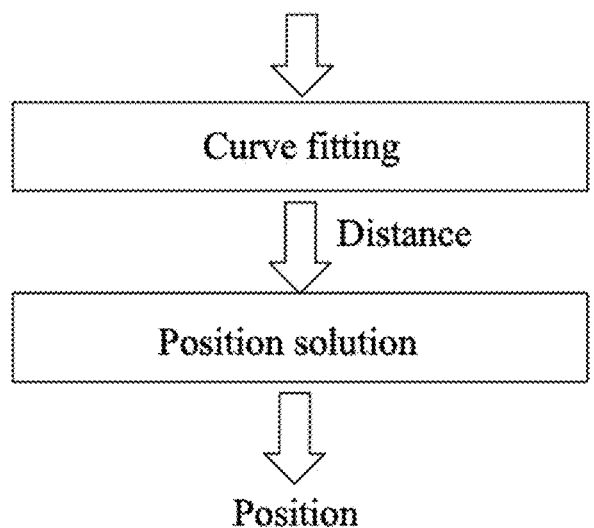
FIG. 3 is a schematic flowchart of a positioning algorithm based on long-term power averaging.

For baseband sampling-based positioning algorithms, this method typically samples a baseband signal at a certain frequency, such as sampling at a frequency of 30.72 M. For long-term power averaging-based positioning algorithms, this method requires a longer duration to obtain a power measurement value. Baseband sampling-based algorithms have dense signal sampling and higher resolution, thus providing relatively high positioning accuracy but also relatively high positioning complexity. Long-term power averaging-based methods have lower signal resolution, thus providing relatively low positioning accuracy but also relatively low complexity. Flowcharts for baseband sampling-based algorithms and long-term power averaging-based methods are shown in FIG. 2 and FIG. 3, respectively.

Baseband sampling-based positioning algorithms include sliding correlation, time of arrival (TOA), and time difference of arrival (TDOA), etc. Long-term power averaging-based algorithms may include path loss-based positioning algorithms. In path loss-based positioning algorithms, the positioning device first combines information such as a transmit power of the base station to calculate the path loss based on a difference between RSRP and transmit power, then converts the path loss into a distance between the base station and the terminal device, and finally perform position solution on the estimated distance to obtain a position estimate. To convert the path loss into the estimated distance, it is required to determine a relationship between the two.

The embodiments of the present disclosure primarily studies path loss-based positioning algorithms. The following describes a positioning process based on the path loss using the signal measurement result being RSRP as an example.

During positioning processing, the positioning device may estimate the path loss of the base station based on the RSRP corresponding to the base station, and then determine the distance between the terminal device and the base station based on the path loss and the relationship between the path loss and the distance. Furthermore, the positioning device may perform position solution based on the distance between the terminal device and the base station to obtain position information of the terminal device. For example, the positioning device may determine the position information of the terminal device based on the distance between the terminal device and the base station, as well as position information of the base station.

In some embodiments, the positioning device may obtain path loss information based on a difference between a transmit power of a reference signal and a receive power (such as RSRP). The above relationship between the path loss and the distance is also referred to as a distance fitting formula in the following text. The distance fitting formula may be determined by fitting a large amount of path losses with accurate distances between the terminal device and the base station.

The conversion from distance to path loss requires consideration of various factors, such as a height of the base station, a height of the terminal device, a usage scenario, whether the transmission from the terminal device to the base station is line-of-sight or non-line-of-sight, a signal bandwidth of the base station, an operating frequency bin of the base station, a penetration loss, etc. The relationship between distance and path loss varies in different scenarios.

Figure 4:
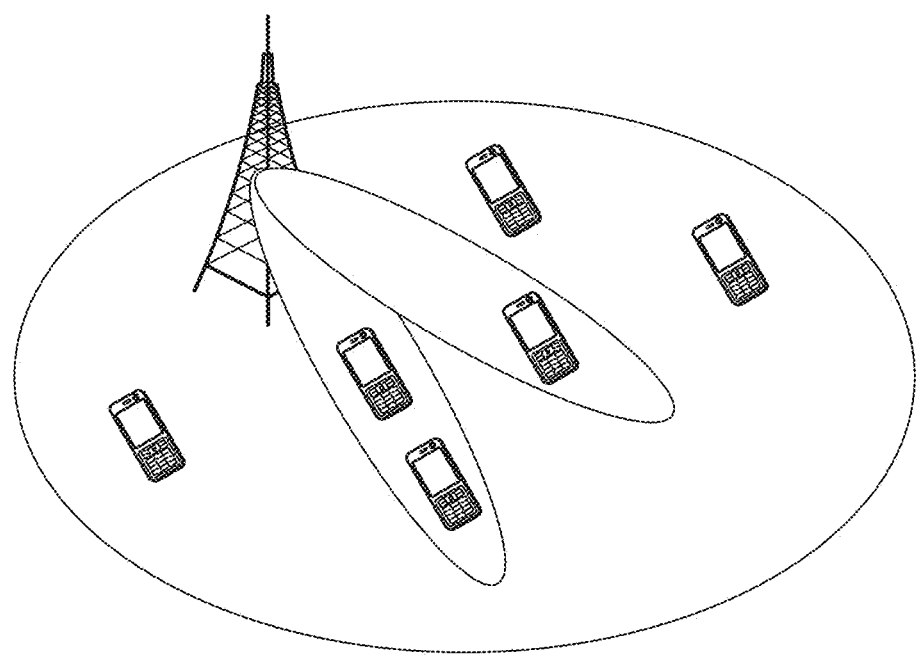
FIG. 4 is a schematic diagram of beamforming.

When the base station employs beamforming, the antenna gain for the terminal device differs in different directions, as shown in FIG. 4.

Under the same transmit power and path loss conditions, theoretically, the receive powers of the terminal device in different directions should be the same. However, due to effects of beamforming, the antenna gain of the base station differs in different directions, resulting in different receive powers for the terminal device in two different directions.

Accurate path loss information may be obtained by subtracting the antenna gain from a power difference between a power of a receive signal and a power of a transmit signal. However, since the direction of the terminal device relative to the base station is unknown, the antenna gain is also unknown, making it impossible to obtain accurate path loss information. Therefore, the path loss estimate may include information about the antenna gain, leading to the path loss estimate including errors regarding the antenna gain. In some cases, the antenna gain of the base station in various directions may also be unknown, thus the impact of antenna gain may only be reflected in the path loss, resulting in inaccurate path loss information. Due to the inability to obtain accurate path loss information, the distance information determined based on the path loss information may also be inaccurate, thereby affecting the positioning accuracy of the terminal device.

Figure 5:
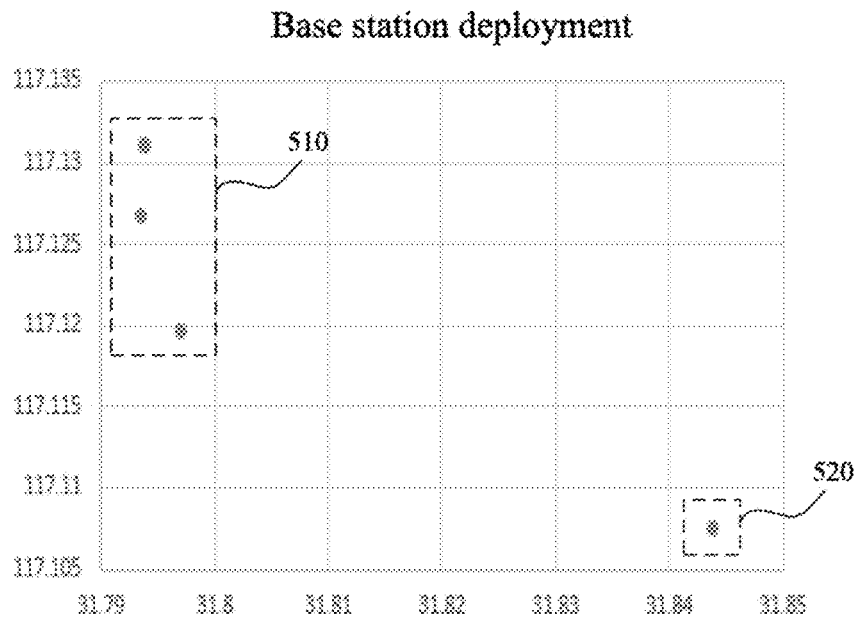
FIG. 5 is a schematic diagram of a position of a base station measured by a terminal device.

In practical applications, during a single RSRP measurement, the terminal device measures the RSRP for a plurality of base stations, which may have different coverage areas. FIG. 5 illustrates base station information measured by the terminal device during a single RSRP measurement, as shown by dots in FIG. 5. A horizontal axis in FIG. 5 represents longitude information, while a vertical axis in FIG. 5 represents latitude information. The coordinate information of the terminal device is (31.8, 117.125).

It is seen from FIG. 5 that there are three base stations 510 within 500 meters of the terminal device, while one base station 520 is more than 500 meters away from the terminal device. According to a channel model, different distance fitting formulas should be used for base stations with coverage areas less than 500 meters and those with coverage areas greater than 500 meters. Due to the different coverage areas of base stations 510 and 520 in FIG. 5, they correspond to different distance fitting formulas. In practical use, a device (such as the positioning device) performing distance fitting does not know the coverage area of the base stations or the distances between the base stations and the terminal device, making it impossible to select an appropriate distance fitting formula. The inability to select the appropriate distance fitting formula leads to inaccurate calculations of the distances between the terminal device and the base stations, thereby affecting the positioning accuracy of the terminal device.

Additionally, in some cases, the positioning device cannot obtain comprehensive and accurate base station information and signal measurement results, and thus cannot obtain the accurate distance fitting formula. In other words, in some scenarios, the distance fitting formula itself may be inaccurate, which may also affect the positioning accuracy of the terminal device.

In summary, as the position of the terminal device varies and the base stations sending signals differ, the distance fitting formula may vary significantly, resulting in considerable uncertainty in path loss fitting, thereby affecting the accuracy of the distance determined based on path loss, further affecting positioning accuracy. Especially in mixed scenarios and cases where the positioning device cannot obtain comprehensive information of the base station, it is difficult to obtain the accurate positioning result according to the above positioning process.

From the various situations described above, it is evident that current positioning methods suffer from low positioning accuracy. Based on this, an embodiment of the present disclosure provides a method for positioning that combines position information of the terminal device with a distance fitting formula to determine the accuracy of the position information of the terminal device, and then to determine whether the distance fitting formula is appropriate based on the accuracy of the position information, i.e., determining whether to adjust the distance fitting formula based on the accuracy of the position information. By determining whether the distance fitting formula is appropriate, it is conducive to improving the positioning accuracy of the terminal device.

Figure 6:
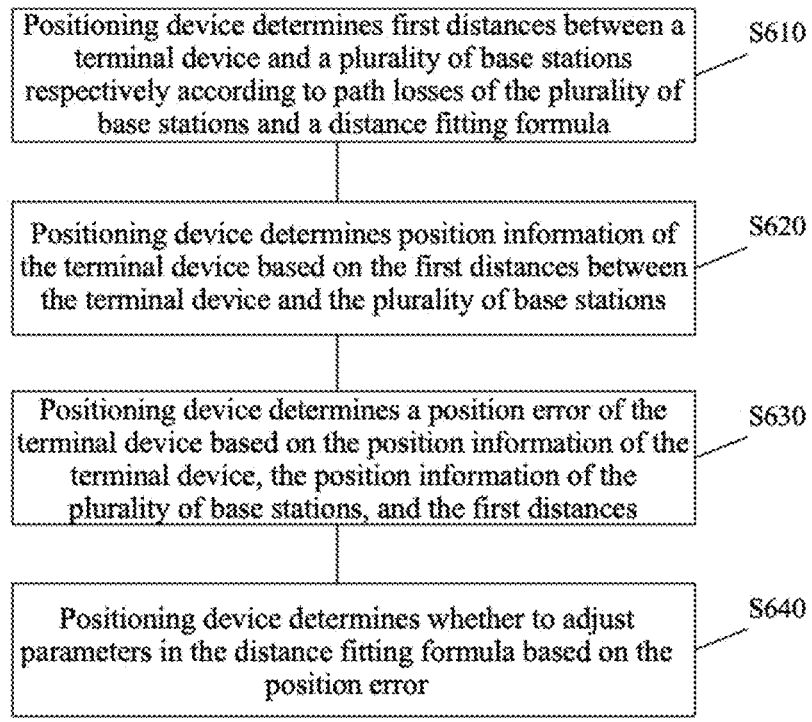
FIG. 6 is a schematic flowchart of a method for positioning according to an embodiment of the present disclosure.

The following describes the solutions of the embodiments of the present disclosure with reference to FIG. 6. The method in the embodiments of the present disclosure may be performed by a positioning device, which may also be referred to as a location server. The positioning device may for example be a location management function (LMF).

Referring to FIG. 6, in operation S610, the positioning device determines first distances between a terminal device and a plurality of base stations respectively according to path losses of the plurality of base stations and a distance fitting formula.

The path loss of the base station may be understood as the path loss between the base station and the terminal device. The path loss of the base station may refer to downlink loss (also referred to as downlink path loss) or uplink loss (also referred to as uplink path loss), which is not limited in the embodiment of the present disclosure.

As an example, the plurality of base stations may send reference signals to the terminal device, and the terminal device may measure the reference signals to obtain signal measurement results. The terminal device may send the signal measurement results for the plurality of base stations to the positioning device. The positioning device may determine the path losses of the plurality of base stations based on the signal measurement results from the terminal device for the plurality of base stations. The reference signals sent by the base stations to the terminal device may for example be positioning reference signals (PRS).

As another example, the terminal device may send reference signals to the plurality of base stations, and the base stations may measure the reference signals sent by the terminal device to obtain signal measurement results. The plurality of base stations may send their respective signal measurement results to the positioning device. The positioning device may determine the path losses of the plurality of base stations based on the signal measurement results from the plurality of base stations. The reference signals sent by the terminal device to the base stations may for example be sounding reference signals (SRS).

The above signal measurement result may include one or more of RSRP, reference signal receiving quality (RSRQ), and signal to interference plus noise ratio (SINR).

In some embodiments, taking the signal measurement result including RSRP as an example, the positioning device may determine the path losses of the plurality of base stations based on the transmit power and receive power of the reference signals.

In some embodiments, the positioning device may determine a path loss of a base station based on a power difference between a transmit power and receive power of a reference signal. For example, the positioning device may directly use this power difference as the path loss of the base station.

In some embodiments, the positioning device may determine the path loss of the base station based on the power difference between the transmit power and receive power of the reference signal, as well as antenna gain information. For example, the positioning device may use a difference between the power difference and the antenna gain as the path loss of the base station.

In some embodiments, the base station may send antenna gain in various directions to the positioning device. The positioning device may determine antenna gain in a direction where the terminal device is located based on orientation information of the terminal device and the antenna gain of the base station in various directions. When performing the path loss estimation, the positioning device may consider the impact of antenna gain in the path loss estimation, which is conducive to obtaining more accurate path loss information and improving the positioning accuracy of the terminal device.

In some embodiments, the orientation information of the terminal device may be determined based on the signal measurement results. The location server may determine approximate orientation information of the terminal device based on the signal measurement results (such as signal measurement results from the serving cell and neighbor cells) from the terminal device for each cell (or base station), in conjunction with historical experience values.

The above first distances may be understood as distances between the terminal device and the base stations determined based on the path losses. The first distances may include a plurality of distances, with each first distance representing a distance between the terminal device and a respective base station.

At operation S620, the positioning device determines position information of the terminal device based on the first distances between the terminal device and the plurality of base stations.

In some embodiments, the positioning device may determine the position information of the terminal device based on the first distances between the terminal device and plurality of base stations, in conjunction with the position information of the plurality of base stations. The number of the plurality of base stations in the present disclosure may be greater than or equal to 2.

In some embodiments, the base station may send its position information to the positioning device so that the positioning device is able to position the terminal device based on the position information of the base station. In some embodiments, the base station may send its position information to the positioning device via NR positioning protocol A (NRPPa) signaling.

At operation S630, the positioning device determines a position error of the terminal device based on the position information of the terminal device, the position information of the plurality of base stations, and the first distances.

The embodiments of the present disclosure do not specifically limit the method for determining the position error of the terminal device. As an example, the positioning device may determine second distances between the terminal device and the plurality of base stations respectively based on the position information of the terminal device and the position information of the plurality of base stations; and the positioning device may determine the position error of the terminal device based on the first distances and the second distances. For example, the positioning device may determine the position error of the terminal device based on a difference between a first distance and a second distance. When determining the difference between the first distance and the second distance, the positioning device may determine a first distance and a second distance for different base stations separately and calculate the difference between the first distance and the second distance for different base stations.

In some embodiments, the position error of the terminal device may be determined based on the difference between the first distance and the second distance for each base station. For example, the positioning device may determine the position error of the terminal device based on a sum of differences between the first distances and the second distances for the plurality of base stations. Of course, the positioning device may also use other algorithms to determine the position error of the terminal device, which is not specifically limited in the embodiments of the present disclosure.

In some embodiments, the formula for calculating the position error of the terminal device may be as follows:

$$E = \sum_{j=1}^{N} w_j (\text{euclidean}(P, BS_j) - d_j) \quad \text{(Formula 1)}$$

where E represents the position error, P represents a position of the terminal device, $BS_j$ represents a position of a $j^{th}$ base station, euclidean represents a Euclidean distance, $d_j$ represents a first distance between the terminal device and the $j^{th}$ base station, $W_j$ represents a weight for the $j^{th}$ base station, $1 \leq j \leq N$, and N represents a number of base stations participating in positioning.

The above formula (1) may be represented as:

$$E = [w_1 \ w_2 \ \ldots \ w_N][\Delta d_1 \ \Delta d_2 \ \ldots \ \Delta d_N]^T$$

where $\Delta d_j = \text{euclidean}(P, BS_j) - d_j$.

In the above formula, euclidean (P, $BS_j$) represents a Euclidean distance between the terminal device and the $j^{th}$ base station. Of course, in addition to the Euclidean distance, the embodiments of the present disclosure may also use other methods to calculate the distance between the terminal device and the base station.

The embodiments of the present disclosure do not specifically limit a value of the weight $W_j$. In some embodiments, values of the weights of all base stations may be equal. In other embodiments, the values of the weights of the plurality of base stations may not be exactly the same. For example, the value of the weight may vary for different base stations.

In some embodiments, the weights of the base stations satisfy the following formula:

$$\sum_{j=1}^{N} w_j = 1.$$

That is, a sum of the weights of all the base stations is equal to 1.

In some embodiments, a weight of a base station of a serving cell may be greater than a weight of a base station of a non-serving cell, meaning that the weights of the base stations may satisfy the following formula:

$$w_m > w_n, m \neq n$$

where m represents a base station number of the serving cell, and n is a base station number of the non-serving cell.

By assigning a larger weight to the base station of the serving cell, it is beneficial to improve positioning accuracy. By incorporating a constraint that the total weight equals 1, the reliability of the position may be reflected. When the $W_j$ corresponding to different base stations are equal, the position error may be represented as $$\sum_{j=1}^{N} \Delta d_j.$$

By comparing E and $$\sum_{j=1}^{N} \Delta d_j,$$

the impact off an estimation error of the serving cell may be reflected. For example, if the weight corresponding to the base station of the serving cell in Formula (1) is greater than the weight corresponding to the base station of the non-serving cell, when $$E - \sum_{j=1}^{N} \Delta d_j$$

exceeds a preset threshold, it indicates that a positioning result based on the serving cell has a significant deviation. If the terminal device is still positioned based on this result, it may lead to inaccurate positioning. Therefore, in this case, the positioning device may consider discarding the measurement result.

In some embodiments, a larger weight may be assigned to the serving cell of the terminal device (e.g., the base station corresponding to the serving cell). In some embodiments, a smaller weight may be assigned to the neighbor cell of the terminal device (e.g., the base station corresponding to the neighbor cell). By assigning different weights to the serving cell and the neighbor cells, the weight of the serving cell is increased, which is beneficial for improving the accuracy of the position error result.

In some embodiments, a smaller weight may be assigned to a cell with a larger coverage area. In some embodiments, a larger weight may be assigned to a cell with a smaller coverage area. By assigning different weights to cells with different coverage areas, the weight of the cell with the smaller coverage area is increased, which is beneficial for improving the accuracy of the position error result.

At operation S640, the positioning device determines whether to adjust parameters in the distance fitting formula based on the position error.

In some embodiments, if the position error is small, the positioning device may not adjust the parameters in the distance fitting formula. A small position error indicates that the position information of the terminal device is relatively accurate, and the distance fitting formula is relatively reasonable. In this case, the parameters in the distance fitting formula may not need to be adjusted.

In some embodiments, if the position error is large, the positioning device may adjust the parameters in the distance fitting formula. A large position error indicates that the accuracy of the terminal device's position information is low, and there may be inaccuracy or inappropriateness in the distance fitting formula. In this case, by adjusting the parameters in the distance fitting formula and using the adjusted distance fitting formula to position the terminal device, it is conducive to improving the accuracy of the positioning result.

The embodiments of the present disclosure do not specifically limit the condition for determining to adjust the parameters in the distance fitting formula. As an example, if the position error includes the difference between the first distance and the second distance between the terminal device and each base station, the positioning device may adjust the parameters in the distance fitting formula when the number of base stations corresponding to the difference being greater than or equal to a preset threshold exceeds a first threshold. For example, assuming the first threshold is 2, if the differences between the first and second distances between the terminal device and 3 base stations are all greater than or equal to the preset threshold, the positioning device needs to adjust the parameters in the distance fitting formula. If the difference between the first distance and the second distance between the terminal device and only one base station is greater than or equal to the preset threshold, while differences between the first distance and the second distance between the terminal device and other base stations are all less than the preset threshold, the positioning device may not need to adjust the parameters in the distance fitting formula.

As another example, if the position error is obtained using the above formula (1), the positioning device may determine whether to adjust the parameters in the distance fitting formula based on whether the position error is greater than or equal to the preset threshold. For example, if the position error is greater than or equal to the preset threshold, the positioning device needs to adjust the parameters in the distance fitting formula; and if the position error is less than the preset threshold, the positioning device may not need to adjust the parameters in the distance fitting formula.

Figure 7:
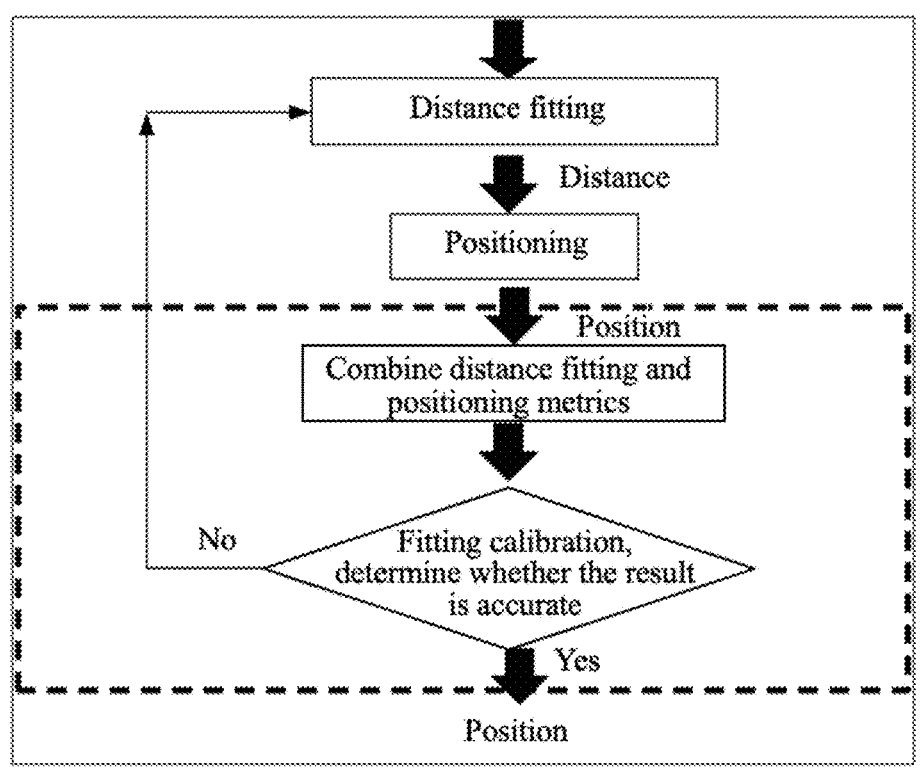
FIG. 7 is a schematic diagram of performing iterative optimization on a distance fitting formula according to an embodiment of the present disclosure.

In some embodiments, the distance fitting formula may be improved iteratively, as shown in FIG. 7. For example, after adjusting the parameters in the distance fitting formula, the adjusted distance fitting formula may be used to re-determine the position information of the terminal device. Then, the position error may be determined using the re-determined position information of the terminal device, and whether the position error is greater than or equal to the preset threshold is then determined. If the position error is less than the preset threshold, the updating of the distance fitting formula may be stopped, and the last determined position information of the terminal device may be taken as final position information. If the position error is still greater than or equal to the preset threshold, the above operations may be repeated until the position error is less than the preset threshold.

The embodiments of the present disclosure do not specifically limit the distance fitting formula. In some embodiments, the parameters in the distance fitting formula may be related to one or more of: base station-related parameters, a fitting factor, a reference path loss value, and a penetration loss. The base station-related parameters may include one or more of: a position, a signal bandwidth, an operating frequency bin, and a coverage area.

In some embodiments, the distance fitting formula may be expressed as:

$$P = N*20*\text{LOG}(D) + P_{O2I} + 20*\text{LOG}(F) + 20*\text{LOG}(B) + P_{refer} \quad \text{(Formula 2)}$$

where P represents a path loss, N represents a fitting factor, D represents a distance between the terminal device and a base station, F represents an operating frequency bin of the base station, B represents a signal bandwidth of the base station, $P_{refer}$ represents a path loss reference value, and $P_{O2I}$ represents a penetration loss. For example, the reference path loss value may refer to a path loss value at a distance of 1 meter.

Formula (2) is merely an example of the distance fitting formula, and the embodiments of the present disclosure are not limited thereto. The distance fitting formula may be formulas of other forms.

The positioning device adjusting the parameters in the distance fitting formula may refer to the positioning device adjusting one or more of the following parameters in the distance fitting formula: the base station-related parameters, the fitting factor, the reference path loss value, and the penetration loss. In some embodiments, the positioning device may adjust the base station-related parameters. In some embodiments, the positioning device may adjust the fitting factor. In some embodiments, the positioning device may adjust the reference path loss value. In some embodiments, the positioning device may adjust the penetration loss.

The base station-related parameters may include one or more of a position, a signal bandwidth, an operating frequency bin, and a coverage area. In some embodiments, the base station-related parameters may include the operating frequency bin and signal bandwidth. In some embodiments, the position of the base station may include coordinates of the base station. In some embodiments, the position of the base station may refer to the placement of the base station, such as whether the base station is placed indoors or outdoors.

The embodiments of the present disclosure do not specifically limit the order of adjusting the parameters in the distance fitting formula. As an example, a plurality of parameters in the distance fitting formula may be adjusted simultaneously. As another example, some parameters in the distance fitting formula may be adjusted first, and if the position error determined using the adjusted distance fitting formula is still greater than or equal to the preset threshold, other parameters may then be adjusted.

In some embodiments, the positioning device may first adjust the base station-related parameters, and after adjusting the base station-related parameters, the positioning device may then adjust other parameters (such as one or more of the fitting factor, reference path loss value, and penetration loss) if the position error is still greater than or equal to the preset threshold. If the position error remains greater than or equal to the preset threshold after adjusting other parameters, the positioning device may continue to adjust the values of other parameters until the position error is less than or equal to the preset threshold. When adjusting other parameters, the positioning device may also consider the base station-related parameters, meaning that the positioning device may also adjust other parameters based on the base station-related parameters.

In some embodiments, the distance fitting formula may be modeled as follows:

$$P = N*20*\text{LOG}(D) + P_0 \quad \text{(Formula 3)}$$

where P represents a path loss, N represents a fitting factor, D represents a distance between the terminal device and a base station, $P_0$ represents a path loss parameter, and $P_0$ is related to one or more of: base station-related parameters, a reference path loss value, and a penetration loss.

The path loss parameter $P_0$ may relate to one or more of: the base station-related parameters, the reference path loss value, and the penetration loss. In other words, the path loss parameter $P_0$ is determined based on one or more of: the base station-related parameters, the reference path loss value, and the penetration loss. Different values of the base station-related parameters, the reference path loss value, and the penetration loss may affect the value of the path loss parameter $P_0$. For example, if the path loss parameter $P_0$ is related to the penetration loss, then when the value of penetration loss changes, the path loss parameter $P_0$ also needs to be adjusted accordingly based on the change in penetration loss.

The embodiments of the present disclosure do not specifically limit the method for the positioning device adjusting the parameters. For example, the positioning device may first adjust the fitting factor N, and if the position error remains greater than or equal to the preset threshold, the positioning device may then adjust $P_0$. For another example, the positioning device may first adjust $P_0$, and if the position error remains greater than or equal to the preset threshold, the positioning device may then adjust the fitting factor N. In some embodiments, the positioning device may perform a two-dimensional search for the fitting factor N and $P_0$ to find the fitting factor and $P_0$ that satisfy min (E). Since the modeling of the fitting formula has low latency requirements, meaning that fitting modeling may tolerate longer processing times, and given that the positioning device has strong computational power, it may handle relatively high search complexity during positioning processing. Therefore, the solutions in the embodiments of the present disclosure are applicable to two-dimensional searches with higher complexity.

In some embodiments, if the positioning device determines to adjust the parameters in the distance fitting formula, such as adjusting the base station-related parameters in the distance fitting formula, the positioning device may request the base station to send updated base station-related parameters. Since operational parameters of the base station may change during use, such as an operating frequency bin, a signal bandwidth, etc., the positioning device may request the base station to send the updated base station-related parameters if a large position error occurs. Utilizing the updated base station-related parameters to adjust the distance fitting formula is beneficial for improving the accuracy of the distance fitting formula.

In some embodiments, the positioning device may send a first request to a plurality of base stations, and the first request is used to request updated base station-related parameters. After receiving the first request, the plurality of base stations may send their respective updated base station-related parameters to the positioning device. After receiving the updated base station-related parameters from the plurality of base stations, the positioning device may use these updated base station-related parameters to adjust the distance fitting formula. For example, the positioning device may replace original base station-related parameters in the distance fitting formula with the updated base station-related parameters. For example, if the operating frequency bin of the base station has been updated, the positioning device may replace the original operating frequency bin in the distance fitting formula with the updated operating frequency bin.

In some embodiments, the positioning device may request the base station to update some or all parameters. That is, the first request may be used to request updates for some of the base station-related parameters, or updates for all of the base station-related parameters. For example, the positioning device may request the base station to update the operating frequency bin and signal bandwidth without updating other parameters.

In some embodiments, the interaction between the positioning device and the base station may be implemented through NRPPa signaling.

Figure 8:
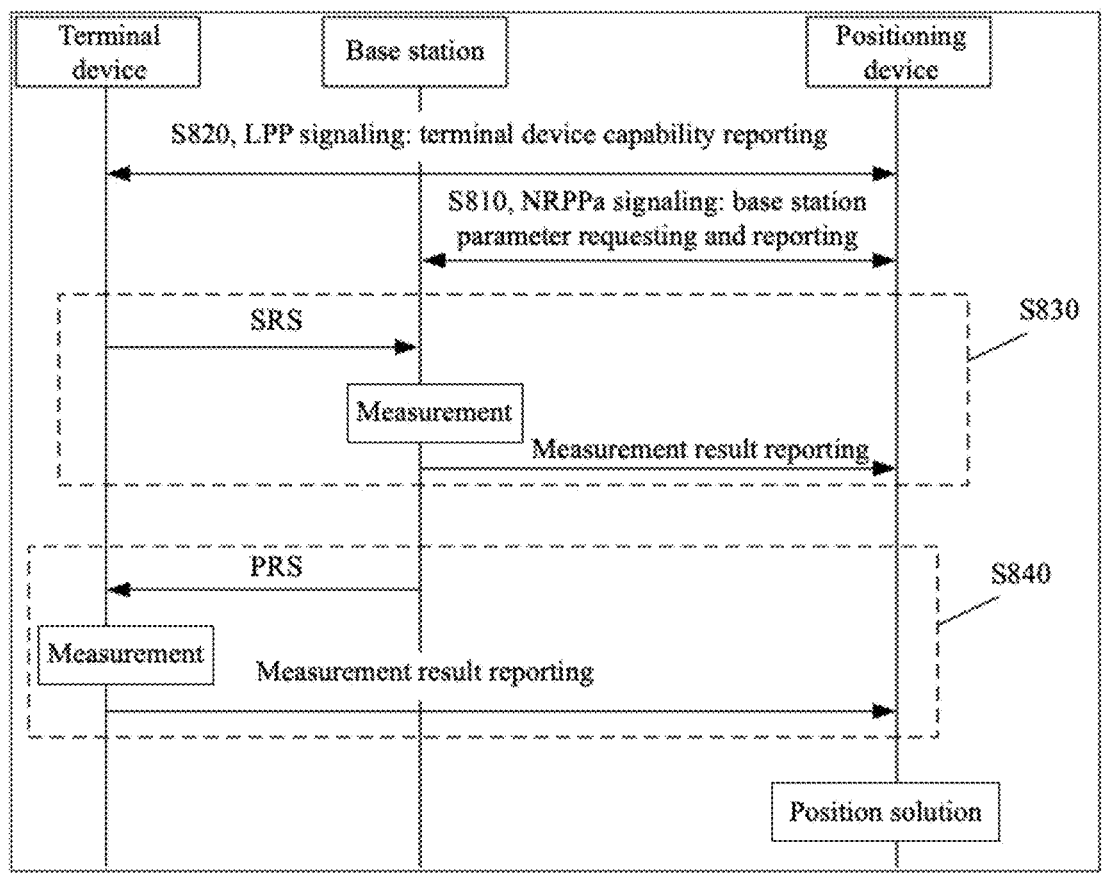
FIG. 8 is a schematic flowchart of positioning a terminal device according to an embodiment of the present disclosure.
Figure 9:
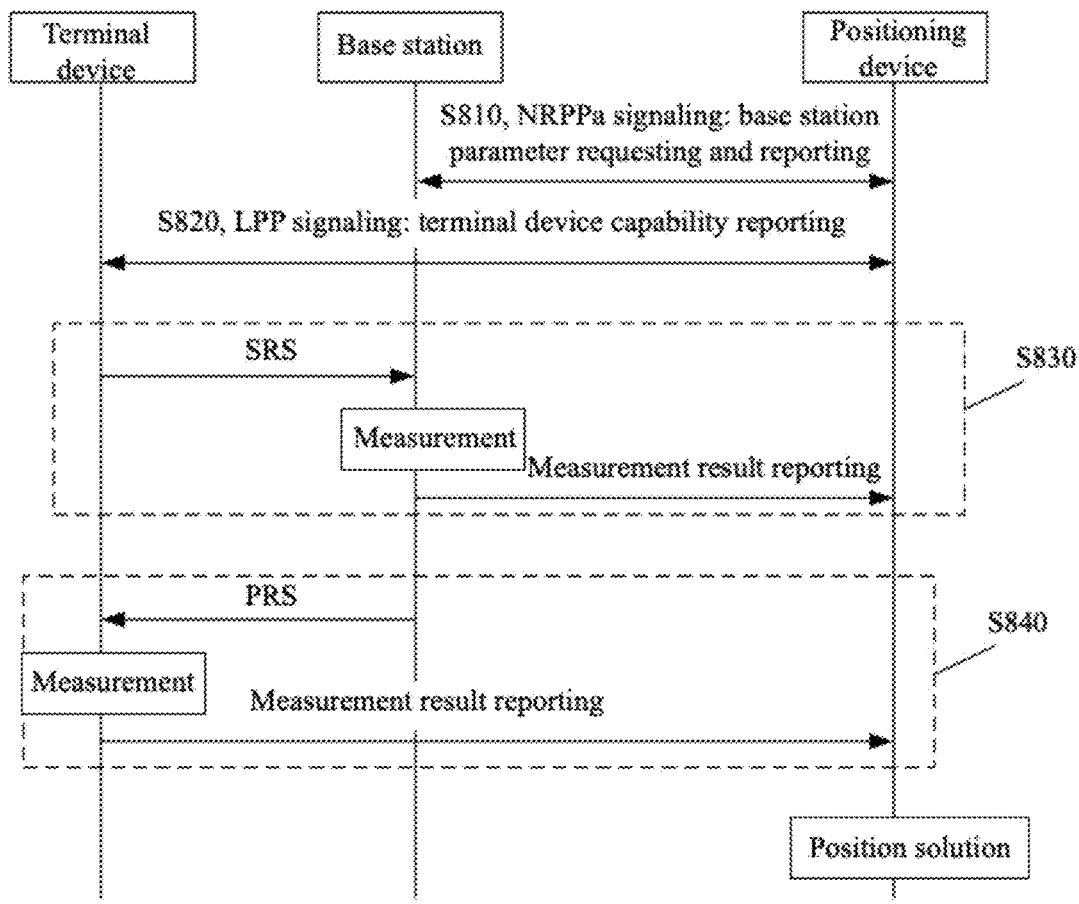
FIG. 9 is another schematic flowchart of positioning a terminal device according to an embodiment of the present disclosure.

The following describes the solutions of the embodiments of the present disclosure in details with reference to FIG. 8 and FIG. 9.

In order to improve the accuracy of distance fitting, the base station may send base station-related parameters to the positioning device, as referenced in operation S810. The base station-related parameters may include the position, height, signal bandwidth, and operating frequency bin of the base station, whether the base station is placed indoors or outdoors, and the coverage area of the base station. The information interaction between the base station and the positioning device may be achieved through NRPPa signaling, as shown in FIG. 8 and FIG. 9.

At operation S820, the terminal device may also report its capability information to the positioning device. The capability information of the terminal device, for example, may include whether the terminal device supports positioning operations and/or types of positioning operations supported by the terminal device. The positioning device may determine a method for positioning the terminal device based on the capability information of the terminal device. The information interaction between the terminal device and the positioning device may be achieved through LTE positioning protocol (LPP) signaling.

The reporting of the capability information of the terminal device and the reporting of the base station-related parameters may occur either before the positioning operation process begins or during the process of the positioning operation. For example, before the terminal device or network device initiates a positioning service request, the terminal device may have already reported its capability information to the positioning device, and the base station may have also reported the base station-related parameters to the positioning device.

The embodiments of the present disclosure do not impose specific limitations on the order of reporting the capability information of the terminal device and reporting the base station-related parameters, meaning that the execution order of operation S810 and operation S820 may be interchanged. As an example, the positioning device may first interact with the terminal device to obtain the capability information of the terminal device, and then interact with the base station to obtain the base station-related parameters, as shown in FIG. 8. As another example, the positioning device may first interact with the base station to obtain the base station-related parameters, and then interact with the terminal device to obtain the capability information of the terminal device, as shown in FIG. 9.

When positioning the terminal device, the positioning device may determine the distance between the terminal device and the base station based on the path loss between the terminal device and the base station, in conjunction with the distance fitting formula. The positioning device may perform position solution based on the distance between the terminal device and the base station to obtain the position information of the terminal device.

The embodiments of the present disclosure do not impose specific limitations on the method of determining the path loss between the terminal device and the base station. For example, the path loss between the terminal device and the base station may be determined based on the process at operation S840. The base station may send a reference signal (such as PRS) to the terminal device, and the terminal device measures the reference signal to obtain a signal measurement result. The terminal device sends the signal measurement result to the positioning device, and the positioning device may determine the path loss information based on the signal measurement result. As another example, the path loss between the terminal device and the base station may be determined based on the process at operation S830. The terminal device may send a reference signal (such as SRS) to the base station, and the base station measures the reference signal to obtain a measurement result. The base station may send the signal measurement result to the positioning device, and the positioning device may determine the path loss information based on the signal measurement result.

In some embodiments, the base station may also send antenna gain information in a plurality of directions to the positioning device. For example, at operation S820, the base station may send antenna gain information in the plurality of directions to the positioning device. The positioning device may determine antenna gain in the orientation of the terminal device based on the antenna gain information, in conjunction with the orientation information of the terminal device. The positioning device may determine the path loss of the base station based on the antenna gain in the orientation of the terminal device, thereby improving the accuracy of the path loss calculation result.

The positioning device may determine the distance between the terminal device and the base station based on the path loss information and the distance fitting formula and perform position solution on this distance to obtain the position information of the terminal device. After obtaining the position information of the terminal device, the positioning device may determine the position error of the terminal device according to formula (1).

In some embodiments, when the position error is high, the positioning device may request the base station to update all or some of the parameters. The positioning device may adjust the distance fitting formula using the updated base station parameters and re-position the terminal device using the adjusted distance fitting formula.

In some embodiments, when the position error is high, the positioning device may adjust the fitting factor and/or reference path loss value, etc., to obtain an updated distance fitting formula. The positioning device may use the updated distance fitting formula to determine the position of the terminal device and calculate the position error of the terminal device. If the position error of the terminal device is still high, the above operations may be repeated until the position error is relatively small and the position information of the terminal device is relatively accurate, as shown in FIG. 6.

In practice, there may be cases where the position error is high, which usually occur when the coverage area of the base station is large and the base station is tall, necessitating a significant adjustment to the fitting factor. When the fitted path loss of a certain base station is much greater than the actual path loss, it may be assumed that the height of the base station is large, and a fitting factor range may be determined according to a fitting factor for a large coverage base station, with a search conducted within this range. Furthermore, a second threshold may be set such that when the positioning error exceeds the second threshold and the fitted path loss is much greater than the actual path loss, the fitting factor range may be determined using the fitting factor for the large coverage base station. In other words, the fitting factor range in the embodiments of the present disclosure may include two ranges: one for base stations with smaller coverage areas, referred to as range 1; and one for base stations with larger coverage areas, referred to as range 2. When the height of the base station is small, or the positioning error is less than or equal to the second threshold, the fitting factor may be adjusted within range 1. When the height of the base station is small, or the positioning error is greater than the second threshold, the fitting factor may be adjusted within range 2.

Figure 10:
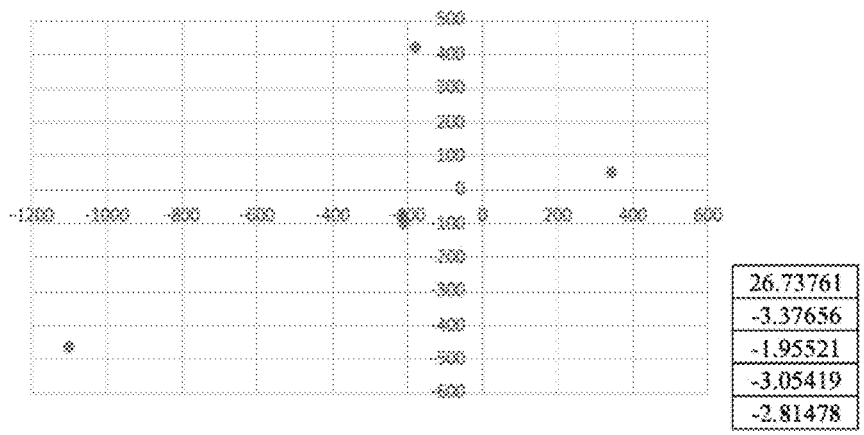
FIG. 10 is a schematic diagram of performing error estimation on a path loss of a base station.

In practice, there may be cases where some base stations have high fitting accuracy while others have low fitting accuracy. As shown in FIG. 10, the dots represent positions of the base stations, and the terminal device has measured the power information of a total of five base stations. The table in FIG. 10 lists path loss estimate errors for these five base stations. The path loss estimate error may be determined based on the estimated path loss value and the actual path loss value. From the table, it is seen that one of the base stations has a relatively large path loss estimate error (26.73761), while the other four base stations have relatively small path loss estimate errors.

When such a situation arises, a base station deletion method may be employed, such as deleting a base station with a large path loss estimate error and using other base stations for position estimation until a position of the terminal device with a smaller estimation error is obtained. During the adjustment of the fitting formula, the deleted path loss estimates do not participate in the fitting formula adjustment process.

The method embodiments of the present disclosure are described in detail above with reference to FIG. 1 to FIG. 10, and the apparatus embodiments of the present disclosure are described in detail below with reference to FIG. 11 to FIG. 12. It should be understood that descriptions of the method embodiments correspond to descriptions of the apparatus embodiments, and therefore, reference may be made to the foregoing method embodiments for parts that are not described in detail.

Figure 11:
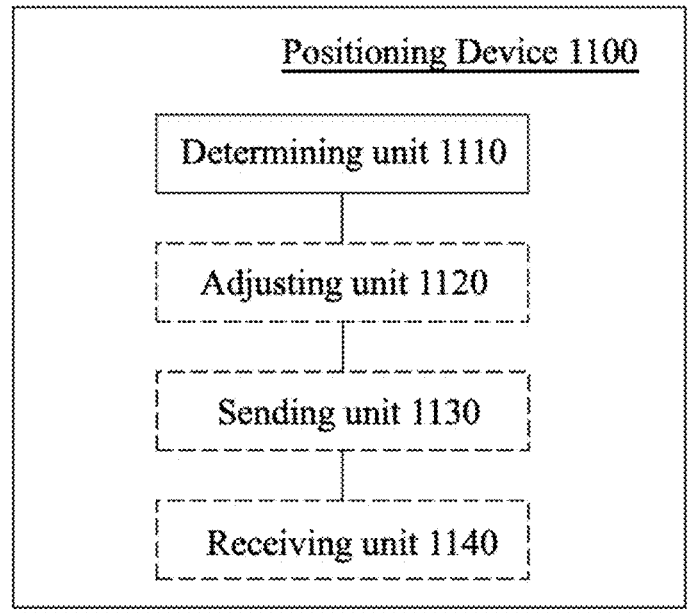
FIG. 11 is a schematic block diagram of a positioning device according to an embodiment of the present disclosure.

FIG. 11 is a schematic block diagram of a positioning device according to an embodiment of the present disclosure. The positioning device 1100 may be any one of the positioning devices described above. The positioning device 1100 may include a determining unit 1110.

The determining unit 1110 may be configured to determine first distances between a terminal device and a plurality of base stations respectively according to path losses of the plurality of base stations and a distance fitting formula.

The determining unit 1110 is further configured to determine position information of the terminal device based on the first distances between the terminal device and the plurality of base stations.

The determining unit 1110 is further configured to determine a position error of the terminal device based on the position information of the terminal device, position information of the plurality of base stations, and the first distances.

The determining unit 1110 is further configured to determine whether to adjust parameters in the distance fitting formula based on the position error.

In some embodiments, the determining unit 1110 is configured to determine second distances between the terminal device and the plurality of base stations respectively based on the position information of the terminal device and the position information of the plurality of base stations; and determine the position error of the terminal device based on the first distances and the second distances.

In some embodiments, the position error is determined based on:

$$E = \sum_{j=1}^{N} w_j (\text{euclidean}(P, BS_j) - d_j)$$

where E represents the position error, P represents a position of the terminal device, $BS_j$ represents a position of a $j^{th}$ base station, euclidean represents a Euclidean distance, $d_j$ represents a first distance between the terminal device and the $j^{th}$ base station, $W_j$ represents a weight of the $j^{th}$ base station, $1 \leq j \leq N$, and N represents a number of base stations participating in positioning.

In some embodiments, weights of the plurality of base stations satisfy:

$$\sum_{j=1}^{N} w_j = 1.$$

In some embodiments, the weights of the plurality of base stations satisfy:

$$w_m > w_n, m \neq n$$

where m is a base station number of a serving cell, and n is a base station number of a non-serving cell.

In some embodiments, the positioning device further includes a discarding unit, configured to discard a measurement result when the position error satisfies:

$$E - \sum_{j=1}^{N} \Delta d_j > \text{a preset threshold,}$$

where $\Delta d_j = \text{euclidean}(P, BS_j) - d_j$.

In some embodiments, the positioning device 1100 further includes: an adjusting unit 1120, configured to adjust the parameters in the distance fitting formula if the position error is greater than or equal to the preset threshold.

In some embodiments, the parameters in the distance fitting formula are related to one or more of: base station-related parameters, a fitting factor, a reference path loss value, and a penetration loss.

In some embodiments, the base station-related parameters include one or more of: a position, a signal bandwidth, an operating frequency bin, and a coverage area.

In some embodiments, the positioning device 1100 further includes: a sending unit 1130, configured to send a first request to the plurality of base stations if the positioning device determines to adjust the parameters in the distance fitting formula, where the first request is used to request updated base station-related parameters; a receiving unit 1140, configured to receive the updated base station-related parameters sent by each of the plurality of base stations; and an adjusting unit 1120, configured to adjust the distance fitting formula using the updated base station-related parameters.

In some embodiments, the distance fitting formula is:

$$P = N*20*\text{LOG}(D) + P_{O21} + 20*\text{LOG}(F) + 20*\text{LOG}(B) + P_{refer},$$

where P represents a path loss, N represents a fitting factor, D represents a distance between the terminal device and a base station, F represents an operating frequency bin of the base station, B represents a signal bandwidth of the base station, $P_{refer}$ represents a path loss reference value, and $P_{O2I}$ represents a penetration loss.

In some embodiments, the distance fitting formula is:

$$P = N*20*\text{LOG}(D) + P_0$$

where P represents a path loss, N represents a fitting factor, D represents a distance between the terminal device and a base station, $P_0$ represents a path loss parameter, and $P_0$ is related to one or more of: base station-related parameters, a reference path loss value, and a penetration loss.

Figure 12:
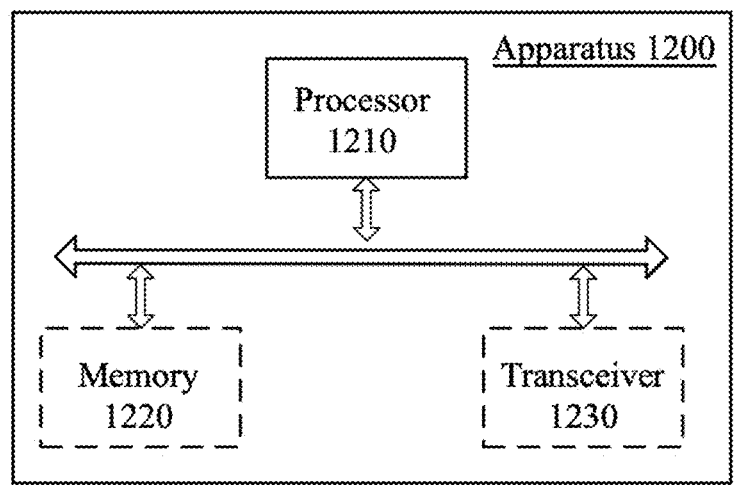
FIG. 12 is a schematic structural diagram of a communication device according to an embodiment of the present disclosure.

FIG. 12 is a schematic structural diagram of an apparatus for communication according to an embodiment of the present disclosure. The dashed line in FIG. 12 indicates that the unit or module is optional. The apparatus 1200 may be configured to implement the method described in the foregoing method embodiments. The apparatus 1500 may be a chip or a positioning device.

The apparatus 1200 may include one or more processors 1210, and the processor 1210 may support the apparatus 1200 to implement the method described in the foregoing method embodiments. The processor 1210 may be a general-purpose processor or a dedicated processor. For example, the processor may be a central processing unit (CPU). Alternatively, the processor may be another general-purpose processor, a digital signal processor (DSP), an application specific integrated circuit (ASIC), a field programmable gate array (FPGA) or other programmable logic devices, a discrete gate or transistor logic device, a discrete hardware component, or the like. The general-purpose processor may be a microprocessor, or the processor may be any conventional processor or the like.

The apparatus 1200 may further include one or more memories 1220 storing a program, and the program may be executed by the processor 1210 to cause the processor 1210 to perform the method described in the foregoing method embodiments. The memory 1220 may be independent of the processor 1210 or may be integrated into the processor 1210.

The apparatus 1200 may further include a transceiver 1230, and the processor 1210 may communicate with another device or chip via the transceiver 1230. For example, the processor 1210 may perform data transceiving with another device or chip via the transceiver 1230.

Embodiments of the present disclosure further provide a computer-readable storage medium, configured to store a program. The computer-readable storage medium may be applied to the terminal or network device provided in the embodiments of the present disclosure, and the program causes the computer to perform the method performed by the terminal or network device in the embodiments of the present disclosure.

Embodiments of the present disclosure further provide a computer program product. The computer program product includes a program. The computer program product may be applied to the terminal or network device provided in the embodiments of the present disclosure, and the program causes the computer to perform the method performed by the terminal or network device in the embodiments of the present disclosure.

Embodiments of the present disclosure further provide a computer program. The computer program may be applied to the terminal or network device provided in the embodiments of the present disclosure, and the computer program causes the computer to perform the method performed by the terminal or network device in the embodiments of the present disclosure.

It should be understood that the terms "system" and "network" in the present disclosure may be used interchangeably. Furthermore, the terms used in the present disclosure are intended solely for the explanation of specific embodiments of the present disclosure and are not meant to limit the present disclosure. The terms "first," "second," "third," and "fourth," as used in the description and claims as well as the accompanying drawings of the present disclosure are intended to distinguish different objects and are not meant to describe a specific order. In addition, the terms "including" and "having," along with any variations thereof, are intended to cover non-exclusive inclusions.

In the embodiments of the present disclosure, the term "indicating" may be directly indicating or indirectly indicating, or may represent that there is an association relationship. For example, A indicates B, which may indicate that A directly indicates B, e.g., B is obtained through A, or may indicate that A indirectly indicates B, e.g., A indicates C and B is obtained through C, or may indicate that A and B have an association relationship.

In the embodiments of the present disclosure, "B corresponding to A" indicates that B is associated with A, and B may be determined based on A. However, it should be further understood that, determining B based on A does not mean that B is determined only based on A, or B may also be determined based on A and/or other information.

In the embodiments of the present disclosure, the term "corresponding" may indicate that there is a direct correspondence or indirect correspondence between the two, or may indicate that there is an association relationship between the two, or may be relationships such as indicating and being indicated, configuring and being configured, etc.

In the embodiments of the present disclosure, the terms "predefined" and "preconfigured" may be implemented by pre-storing a corresponding code, a table, or another manner that can be used to indicate related information in a device (e.g., a terminal device and a network device), and a specific implementation is not limited in the present disclosure. For example, the predefined may indicate being defined in a protocol.

In the embodiments of the present disclosure, the term "protocol" may refer to a standard protocol in the field of communications, such as an LTE protocol, an NR protocol, and related protocols applied to a future communications system, which is not limited in the present disclosure.

In the embodiments of the present disclosure, the term "and/or" is merely an association relationship for describing associated objects, indicating that there are three relationships, e.g., A and/or B may indicate that A exists alone, A and B exist at the same time, and B exists alone. In addition, the character "/" in this specification generally indicates an "or" relationship between the associated objects.

In various embodiments of the present disclosure, a size of a sequence number of each process does not mean an execution sequence, and the execution sequence of each process should be determined by its function and internal logic but should not constitute any limitation on an implementation process of the embodiments of the present disclosure.

In the several embodiments provided in the present disclosure, it should be understood that the disclosed system, apparatus, and method may be implemented in other manners. For example, the apparatus embodiments described above are merely illustrative, and the division of the units is merely a logical function division. In actual implementation, there may be alternative division manners, such as combining a plurality of units or components or integrating them into another system, or ignoring or not executing some features. In addition, the shown or discussed mutual coupling or direct coupling or communication connection may be indirect coupling or communication connection through some interfaces, devices, or units, which may be electrical, mechanical, or in other forms.

The units described as separate parts may or may not be physically separate, and parts shown as units may or may not be physical units, i.e., may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium, for example, the computer instructions may be transmitted from a website, a computer, a server, or a data center to another website, computer, server, or data center in a wired (e.g., a coaxial cable, an optical fiber, a digital subscriber line (DSL)) or a wireless (e.g., infrared, wireless, microwave, etc.) manner. The computer-readable storage medium may be any usable medium readable by a computer, or a data storage device, such as a server or a data center including one or more integrated usable media. The usable medium may be a magnetic medium (e.g., a floppy disk, a hard disk, or a magnetic tape), an optical medium (e.g., a digital video disk (DVD)), a semiconductor medium (e.g., a solid state disk (SSD)), or the like.

The foregoing descriptions are merely specific implementations of the present disclosure, but the protection scope of the present disclosure is not limited thereto, and any changes or substitutions may be easily conceived of by a person skilled in the art within the technical scope disclosed in the present disclosure. Therefore, the protection scope of the present disclosure shall be subject to the protection scope of the claims.

What is claimed is:

1. A method for positioning, comprising:
   determining, by a first device, first distances between a terminal device and a plurality of base stations respectively according to path losses of the plurality of base stations and a distance fitting formula;
   determining, by the first device, position information of the terminal device based on the first distances between the terminal device and the plurality of base stations;
   determining, by the first device, second distances between the terminal device and the plurality of base stations respectively according to the position information of the terminal device and position information of the plurality of base stations;
   determining, by the first device, a position error of the terminal device based on the first distances and the second distances; and
   determining, by the first device, whether to adjust parameters in the distance fitting formula based on the position error.

2. The method according to claim 1, wherein the position error is determined based on:

$$E = \sum_{j=1}^{N} w_j(\text{euclidean}(P, BS_j) - d_j)$$

wherein E represents the position error, P represents a position of the terminal device, $BS_j$ represents a position of a $j^{th}$ base station, euclidean represents a Euclidean distance, $d_j$ represents a first distance between the terminal device and the $j^{th}$ base station, $W_j$ represents a weight for the $j^{th}$ base station, $1 \leq j \leq N$, and N represents a number of base stations participating in positioning.

3. The method according to claim 2, wherein the weights of the plurality of base stations satisfy:

$$\sum_{j=1}^{N} w_j = 1.$$

4. The method according to claim 3, wherein the weights of the plurality of base stations satisfy:

$$w_m > w_n, m \neq n$$

wherein m is a base station number of a serving cell, and n is a base station number of a non-serving cell.

5. The method according to claim 4, further comprising:
discarding, by the first device, a measurement result when the position error satisfies:

$$E - \sum_{j=1}^{N} \Delta d_j > \text{a preset threshold},$$

wherein $\Delta d_j = \text{euclidean}(P, BS_j) - d_j$.

6. The method according to claim 1, further comprising:
adjusting, by the first device, the parameters in the distance fitting formula if the position error is greater than or equal to a preset threshold.

7. The method according to claim 6, wherein the parameters in the distance fitting formula are related to at least one of: base station-related parameters, a fitting factor, a reference path loss value, or a penetration loss.

8. The method according to claim 7, wherein the base station-related parameters include at least one of: a position, a signal bandwidth, an operating frequency bin, or a coverage area.

9. The method according to claim 7, further comprising:
when the first device determines to adjust the parameters in the distance fitting formula:
  sending, by the first device, a first request to the plurality of base stations, wherein the first request is used to request updated base station-related parameters;
  receiving, by the first device, the updated base station-related parameters sent by each of the plurality of base station; and
  adjusting, by the first device, the distance fitting formula using the updated base station-related parameters.

10. The method according to claim 1, wherein the distance fitting formula is:

$$P = N * 20 * LOG(D) + P_{O2I} + 20 * LOG(F) + 20 * LOG(B) + P_{refer},$$

wherein P represents a path loss, N represents a fitting factor, D represents a distance between the terminal device and a base station, F represents an operating frequency bin of the base station, B represents a signal bandwidth of the base station, $P_{refer}$ represents a path loss reference value, and $P_{O2I}$ represents a penetration loss.

11. The method according to claim 1, wherein the distance fitting formula is:

$$P = N * 20 * LOG(D) + P_0$$

wherein P represents a path loss, N represents a fitting factor, D represents a distance between the terminal device and a base station, $P_0$ represents a path loss parameter, and $P_0$ is related to one or more of: base station-related parameters, a reference path loss value, and a penetration loss.

12. A first device, comprising:
at least one processor; and
one or more non-transitory computer-readable storage media coupled to the at least one processor and storing programming instructions for execution by the at least one processor, wherein the programming instructions, when executed, cause the first device to perform operations comprising:
  determining first distances between a terminal device and a plurality of base stations respectively according to path losses of the plurality of base stations and a distance fitting formula;
  determining position information of the terminal device based on the first distances between the terminal device and the plurality of base stations;
  determining second distances between the terminal device and the plurality of base stations respectively according to the position information of the terminal device and position information of the plurality of base stations;
  determining a position error of the terminal device based on the first distances and the second distances; and
  determining whether to adjust parameters in the distance fitting formula based on the position error.

13. The first device according to claim 12, wherein the position error is determined based on:

$$E = \sum_{j=1}^{N} w_j(\text{euclidean}(P, BS_j) - d_j)$$

wherein E represents the position error, P represents a position of the terminal device, $BS_j$ represents a position of a $j^{th}$ base station, euclidean represents a Euclidean distance, $d_j$ represents a first distance between the terminal device and the $j^{th}$ base station, $W_j$ represents a weight for the $j^{th}$ base station, $1 \leq j \leq N$, and N represents a number of base stations participating in positioning.

14. The first device according to claim 13, wherein the weights of the plurality of base stations satisfy:

$$\sum_{j=1}^{N} w_j = 1.$$

15. The first device according to claim 14, wherein the weights of the plurality of base stations satisfy:

$$w_m > w_n, m \neq n$$

wherein m is a base station number of a serving cell, and n is a base station number of a non-serving cell.

16. The first device according to claim 15, the operations further comprising:
discarding, by the first device, a measurement result when the position error satisfies:

$$E - \sum_{j=1}^{N} \Delta d_j > \text{a preset threshold},$$

wherein $\Delta d_j = \text{euclidean}(P, BS_j) - d_j$.

17. The first device according to claim 12, the operations further comprising:
adjusting, by the first device, the parameters in the distance fitting formula if the position error is greater than or equal to a preset threshold.

18. The first device according to claim 17, wherein the parameters in the distance fitting formula are related to at least one of: base station-related parameters, a fitting factor, a reference path loss value, or a penetration loss.

19. The first device according to claim 18, wherein the base station-related parameters include at least one of: a position, a signal bandwidth, an operating frequency bin, or a coverage area.

20. One or more non-transitory computer-readable media storing computer instructions, that when executed by one or more processors, cause a computing device to perform operations comprising:
- determining first distances between a terminal device and a plurality of base stations respectively according to path losses of the plurality of base stations and a distance fitting formula;
- determining position information of the terminal device based on the first distances between the terminal device and the plurality of base stations;
- determining second distances between the terminal device and the plurality of base stations respectively according to the position information of the terminal device and position information of the plurality of base stations;
- determining a position error of the terminal device based on the first distances and the second distances; and
- determining whether to adjust parameters in the distance fitting formula based on the position error.

* * * * *